United States Patent [19]
Takeuchi

[11] 3,913,161
[45] Oct. 21, 1975

[54] VEHICLE CLEANING APPARATUS
[75] Inventor: Shigeo Takeuchi, Nagoya, Japan
[73] Assignee: Takeuchi Tekko Kabushiki Kaisha, Nagoya, Japan
[22] Filed: Nov. 2, 1973
[21] Appl. No.: 412,435

[30] Foreign Application Priority Data
June 18, 1973   Japan.................................. 48-68527

[52] U.S. Cl. .............................. 15/21 E; 15/DIG. 2
[51] Int. Cl.²........................................ B60S 30/06
[58] Field of Search............. 15/DIG. 2, 21 D, 21 E, 15/97 R

[56] References Cited
UNITED STATES PATENTS
2,708,446   5/1955   Phillips ........................... 15/DIG. 2

| | | | |
|---|---|---|---|
| 3,662,419 | 5/1972 | Dini.................... | 15/21 E |
| 3,747,151 | 7/1973 | Takeuchi............... | 15/21 E |

FOREIGN PATENTS OR APPLICATIONS
196,564   7/1967   U.S.S.R........................... 15/DIG. 2

*Primary Examiner*—Edward L. Roberts
*Attorney, Agent, or Firm*—Waters, Schwartz & Nissen

[57] ABSTRACT

A rotatable cleaning brush or brushes are supported by a portally shaped swingable frame which is pivotally secured at the bottom to the travelling type portal frame structure of the apparatus for swinging movement relative thereto in the direction in which the structure is moved. The distance over which the structure is required to travel is substantially reduced to enable the apparatus to be installed even in a much restricted area.

11 Claims, 8 Drawing Figures

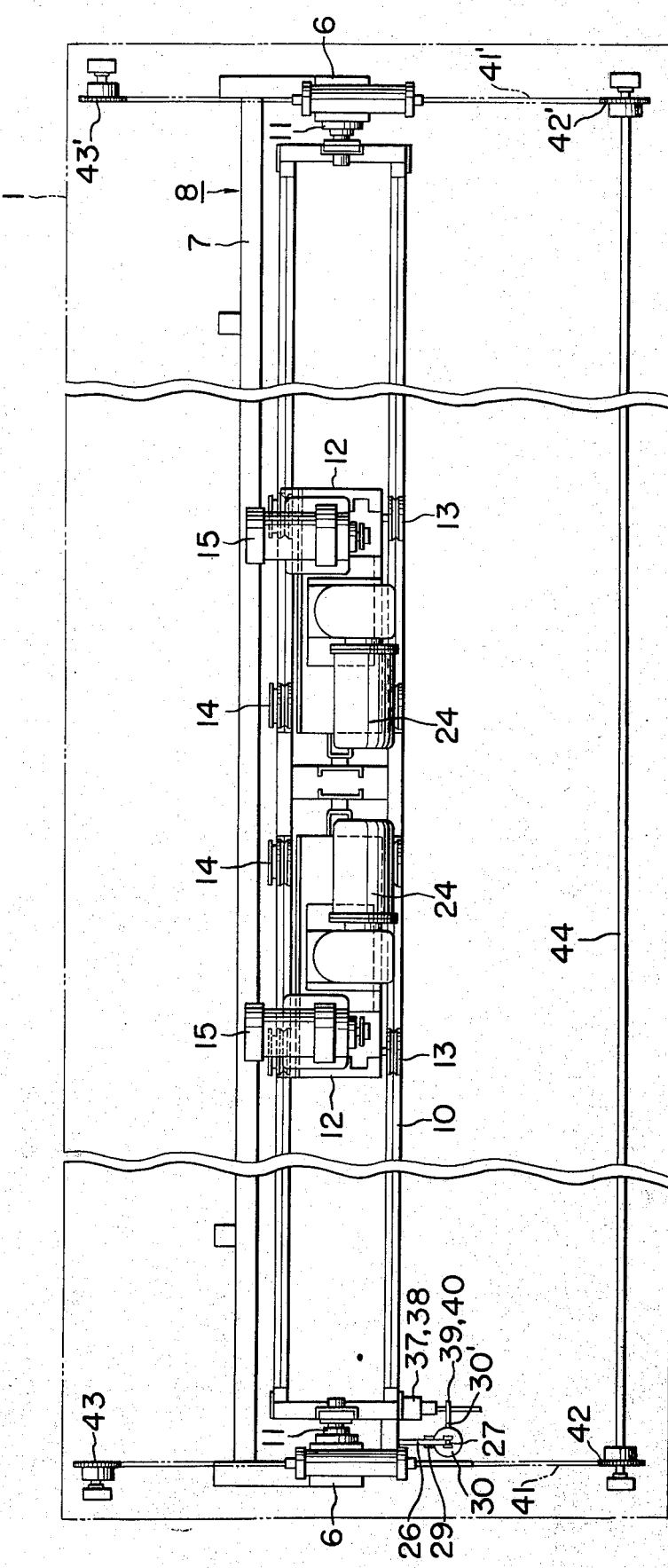

VEHICLE CLEANING APPARATUS

BACKGROUND OF THE INVENTION

This invention relates generally to vehicle cleaning apparatus of the type including rotatable cylindrically shaped brushes for cleaning the top and side surfaces of a vehicle such as an automobile.

Previously known is a vehicle cleaning apparatus of the type described which has top and side cleaning brushes mounted on a portally shaped frame structure adapted to travel back and forth over a vehicle standing still so that the exterior surfaces thereof may be cleaned by the brushes mounted on the portal structure during the travelling movement thereof. The vehicle cleaning apparatus, of the so-called travelling type, is commonly installed in a limited ground space such as of a refueling station and it is strongly desired that the stroke of travel of the portal frame structure be reduced as far as possible to enable it to be installed even in a very restricted area.

SUMMARY OF THE INVENTION

The present invention is intended to meet this requirement in an ingenious manner and has for its object the provision of a new and improved vehicle cleaning apparatus, of the travelling type, which includes cleaning brushes supported on the portally shaped travelling frame by means of a support structure adapted to move relative to the portal frame in the direction of travel thereof and is thus capable of cleaning the whole exterior of a vehicle efficiently with a minimized stroke of travel of the portal frame.

BRIEF DESCRIPTION OF THE DRAWINGS

The present invention will next be described in detail with reference to the accompanying drawings, which illustrate one preferred embodiment of the invention and in which:

FIG. 3 is a plan view of the apparatus; and

DESCRIPTION OF THE PREFERRED INVENTION

Figure 1:
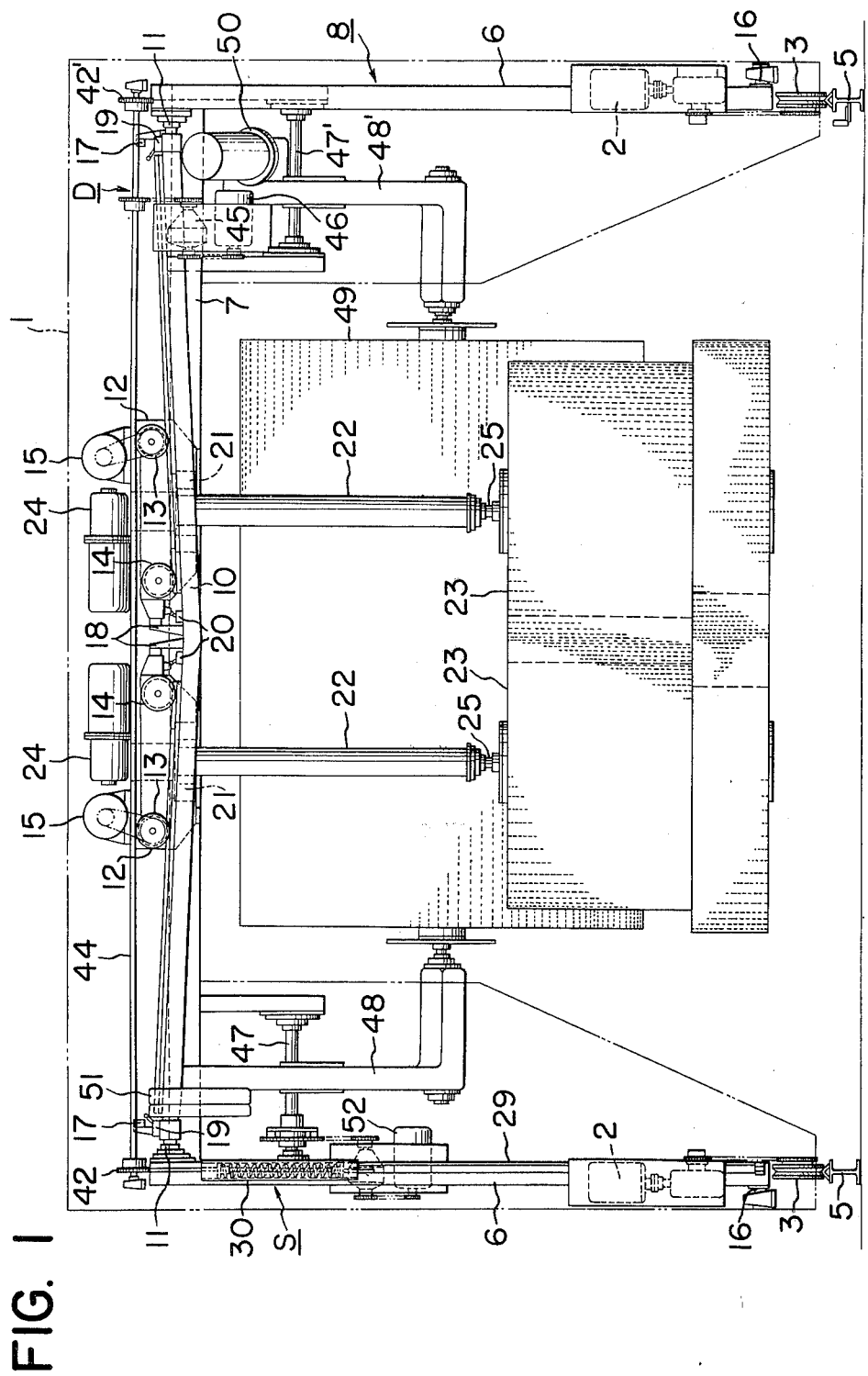
FIG. 1 is a front elevation of the apparatus embodying the present invention.
Figures 2, 2A:
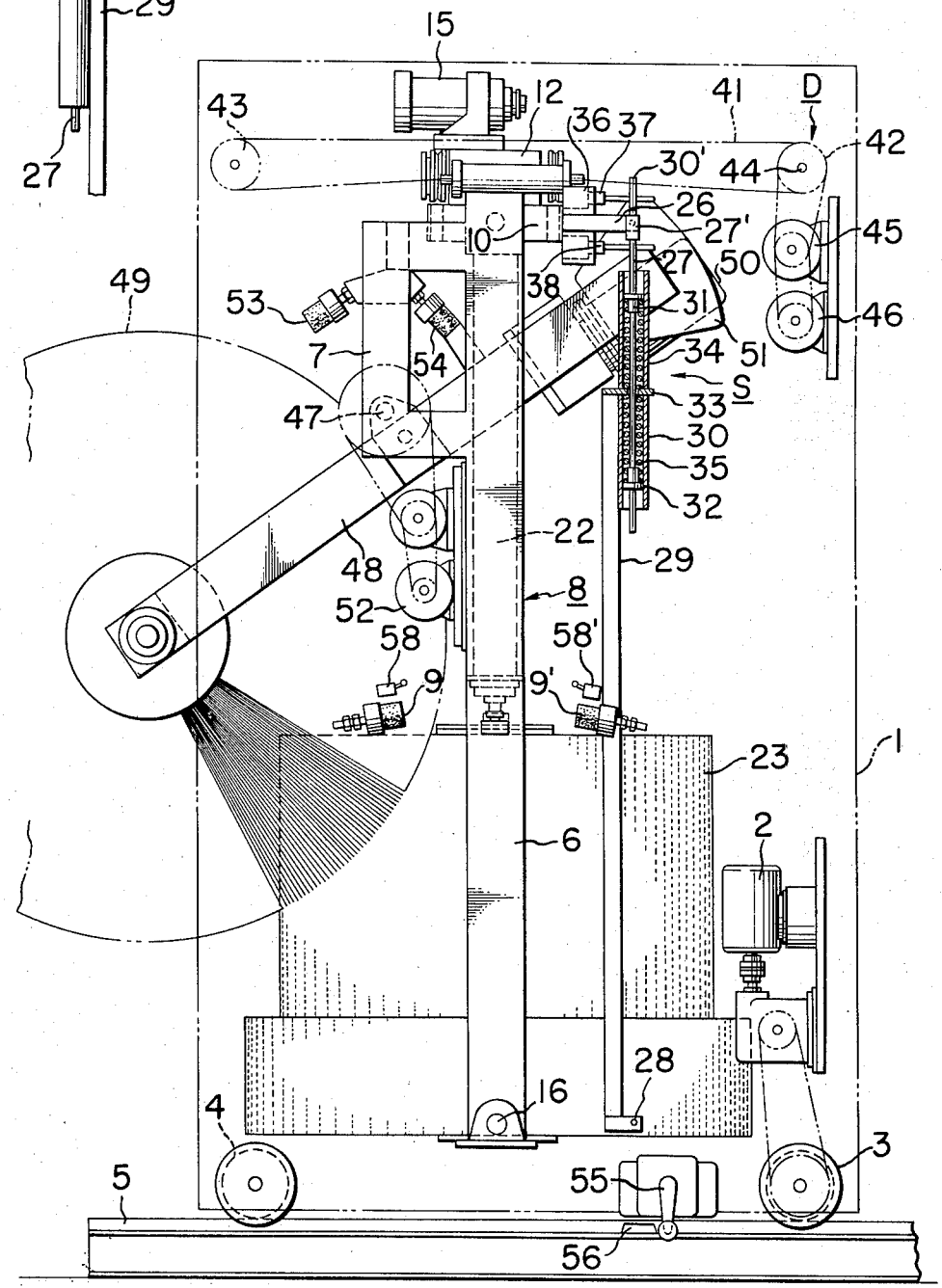
FIG. 2 is a side elevation of same.
FIG. 2A is a fragmentary side view showing parts of the apparatus, looking from the side opposite to that shown in FIG. 2.

Referring to the drawings and first to FIGS. 1 and 2, reference numeral 1 indicates a travelling frame portally shaped so that it may travel over a vehicle in straddling relation thereto. The travelling frame 1 is mounted on a pair of guide rails 5, laid on the ground, through the intermediary of two pairs of driven and free wheels 3 and 4 journaled on the bottom of the side columns of the portal frame 1 with a drive motor 2 provided to drive each of the driven wheels 3. Obviously, with this arrangement, the portal frame 1 can travel along the guide rails 5 in either direction as the wheels 3 are driven to rotate.

Reference numeral 8 generally indicates a portally shaped swingable frame structure comprised of a pair of side leg members 6, 6 and a horizontally extending beam member 7, interconnecting the leg members at the top thereof, and pivoted at the bottom to the bottom ends of the side columns of the travelling frame 1 substantially in the center of the column bottoms, as indicated at 16, for back and forth swinging movement relative to the travelling frame 1. As seen in FIG. 2, the travelling frame 1 is provided on at least one of the side columns thereof with a pair of stop means 9, 9' arranged in spaced-apart relation to each other on the opposite sides of the adjacent side leg member 6 of the swingable portal frame 8 and with a pair of control elements 58, 58' operably associated with the respective stop means 9, 9'. The stop means 9, 9' are engageable with the respective sides of the frame leg member 6 to serve the purpose of defining the angular range of back and forth swinging movement of the portal swingable frame 8 while, on the other hand, control elements 58, 58' are each operable upon engagement of the associated stop means 9 or 9' with the swingable frame 8 to de-energize a motor 46 provided, as will be described hereinafter, to cause the frame 8 to swing.

A trolley track 10 is journaled on top of the portal swingable frame 8 by means of bearings 11, 11 and, as seen in FIG. 1, is comprised of right and left half sections inclined downward from the respective ends of the track 10 to the middle thereof. Mounted on the track 10 are a pair of trolleys 12, 12 each of which is provided with a pair of wheels 13 drivably connected with a motor 15 by appropriate clutch means and a pair of freely rotatable wheels 14, both pairs of wheels 13, 14 being supported on the track 10 so that the trolley 12 can travel along the associated inclined half section of the track 10 outwardly with rotation of the wheels 13 and inwardly upon disengagement of the clutch means, connecting the wheels 13 with drive motor 15, under the effect of the weight of the trolley itself. In this manner, the trolleys 12, 12 are movable toward and away from each other to assume a closed and an open position, respectively, on the track 10. Reference numerals 17 and 18 indicate stop means provided on the track 10 at the opposite ends and at the middle thereof, respectively, to define the open and closed positions of the two trolleys 12, 12. Also provided on the track 10 are two pairs of control elements 19 and 20 which are actuated by the trolleys assuming their open and closed positions, as will be described hereinafter in more detail.

A hollow brush supporting arm 22 is swingably suspended from each of trolleys 12 by appropriate cushion means 21 with a generally cylindrical side brush 23 rotatably supported on the bottom end of the arm 22. Mounted on the trolley 12 is a drive motor 24 which is connected with the side brush 23 through the medium of a drive shaft 25, extending through the hollow arm 22, to turn the side brush 23 for cleaning operation.

The trolley track 10, which is journaled on the portal swingable frame 8, as described hereinbefore, and rockable relative thereto about a horizontal axis, is resiliently supported by the travelling frame structure 1 through the medium of a resilient support assembly S, which will next be described in detail with particular reference to FIG. 2.

As shown in FIG. 2, the trolley track 10 is provided on one side thereof with a lateral arm 26 which extends therefrom substantially in a horizontal direction with a rod 27 pivotally connected to the extremity of the arm 26, as indicated at 27'. The rod 27 extends through a tubular spring case 30, which is secured to the top of a support rod 29, which in turn is pivoted, as at 28, to the bottom of the travelling frame 1. Spring seats 31 and 32 are fixed to the rod 27 and slidably fitted in the spring case 30, which has a spring seat 33 secured thereto between the spring seats 31 and 32 and accommodates a pair of upper and lower coiled neutralizing springs 34 and 35 on the opposite sides of the spring seat 33. As will readily be understood, the two coiled springs 34 and 35, co-operating with each other, tend to support the trolley track 10 resiliently in a horizontal position irrespective of the angular position of the swingable portal frame 8. Referring also to FIG. 2A, the trolley track 10 is provided with a pair of control elements 37, 38 arranged thereon by means of a mounting piece 36 and each including a feeler or actuator extending across an operating rod 30', which is fixed to the spring case 30 at the top thereof and carries a pair of operating projections 39, 40 arranged for operative engagement with the respective feelers of control elements 37, 38.

Reference character D generally indicates drive means provided for swinging the portal swingable frame 8 relative to the travelling frame 1 about the axis of pivotal connection 16 therewith. The construction and arrangement of the drive means D will next be described with reference to FIGS. 2 and 3.

A pair of chain belts 41 and 41' are secured at the opposite ends thereof to the top of portal swingable frame 8 on the opposite sides thereof and respectively entrained about two pairs of horizontally spaced apart chain sprocket wheels 42–43 and 42'–43', which are journaled on the respective sides of the top portion of the travelling frame 1. Sprocket wheels 42, 42' are connected with each other by a horizontal shaft 44 for rotation therewith. As shown in FIG. 2, the horizontal shaft 44 is operatively connected with a drive motor 46 through the sprocket wheel 42 and a speed reduction unit 45 connected therewith and with drive motor 46 by respective chain beltings so that, upon energization of drive motor 46, the sprocket wheels 42, 42' are driven to rotate with the shaft 44 and the chain belts 41, 41' are driven to cause the portal swingable frame 8 to swing either forward or backward about the axis of pivotal connection 16 with the travelling frame 1.

As shown in FIGS. 1 and 2, a pair of horizontal support shafts 47, 47' are journaled on the opposite sides of the portal swingable frame 8 with arm brackets 48, 48' firmly secured to the respective support shafts 47, 47'. Supported between the bottom ends of the respective arm brackets 48, 48' is a cylindrically shaped top-cleaning brush 49 which is driven to rotate by a drive motor 50 secured to the top end of the arm bracket 48' through the medium of a transmission mechanism arranged therein. The drive motor 50 also serves as a counterweight for the top brush assembly including arm brackets 48, 48'. One of the horizontal support shafts, 47, is connected with a drive motor 52 through an appropriate speed reduction unit and can be driven to cause the arm brackets 48, 48' to swing up and down together with the top cleaning brush 49. As shown in FIG. 2, a pair of stop means 53, 54 are provided on the portal swingable frame 8 for engagement with the respective sides of the brush supporting arm bracket 48 to define the top and bottom position of the top cleaning brush 49.

Also in FIG. 2, reference numeral 55 indicates a control element provided on the bottom of travelling frame 1 in a position to be actuated by dog means 56, 57 (see also FIG. 4c) arranged on one of the guide rails 5 at the opposite ends thereof to serve the purpose described hereinafter.

Description will next be made of the operation of the vehicle cleaning apparatus of the present invention primarily with reference to FIGS. 4a, 4b, 4c and 4d.

Figure 4C:
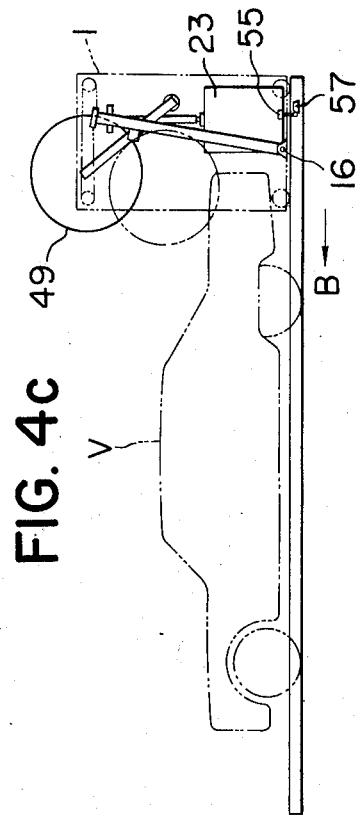
FIGS. 4a, 4b, 4c and 4d are schematic side views illustrating the successive stages of cleaning operation of the apparatus embodying the present invention.
Figure 4D:
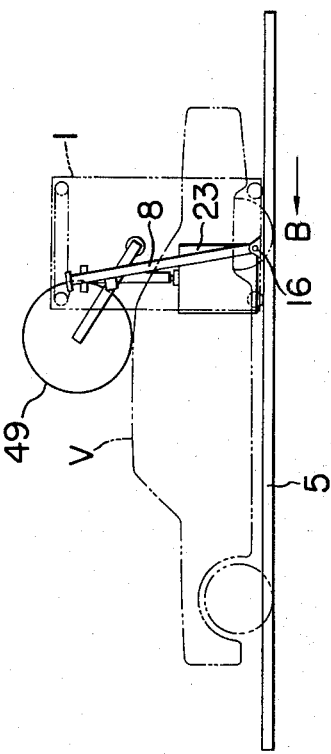
Figure 4A:
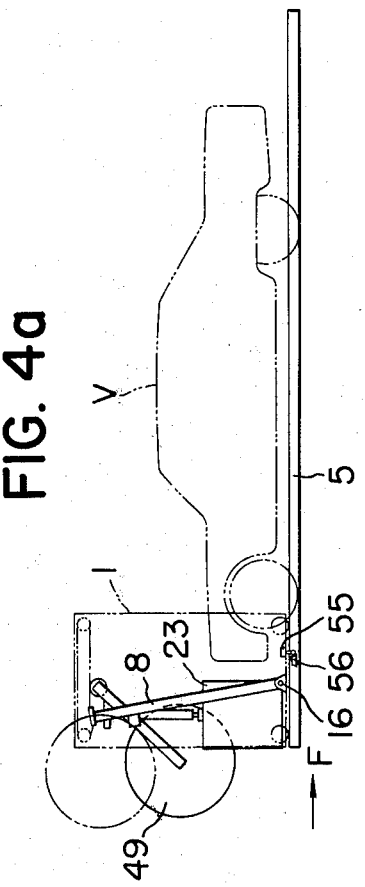

As shown in FIG. 4a, the travelling frame 1 is first arranged on the left end of the guide rails 5 with the swingable frame 8 swung backward of the travelling frame 1, i.e., to the left, as viewed in the figure, and a vehicle V to be cleaned is placed at rest between the guide rails 5. Initially, upon closure of a starting switch, not shown, the top brush 49 is lowered under the drive of motor 52 until the brush supporting arm bracket 48 is brought into engagement with stop 54 and at the same time is started to rotate under the drive of motor 50. On the other hand, the side brushes 23, 23 are started to rotate under the drive of respective motors 24, 24 and the clutches arranged between the drive motors 15, 15 and trolley wheels 13, 13 are released to allow the respective trolleys 12, 12 to run under gravity inwardly along the oppositely inclined sections of trolley track 10.

In this manner, the trolleys 12, 12 come into engagement with the respective stops 18, 18 to assume the closed position shown in FIG. 1 and simultaneously with the control elements 20 are actuated to energize the motor 2 so that the travelling frame 1 is started to travel in the direction indicated by the arrow F in FIG. 4a.

The side brushes 23, 23 are thus brought into engagement with the front of the vehicle V and swung slightly backward or leftward, as viewed in FIG. 4a, together with the trolley track 10 about the aligned axes of the bearings 11 until they assume a position inclined at an angle of about 5° to the vertical when the control element 38 is actuated by the operating projection 40 to de-energize the drive motor 2 and travelling frame 1 comes to stop. Simultaneously with this, the clutches between the drive motors 15, 15 and trolley wheels 13, 13 are connected so that the trolleys 12, 12 are started to travel away from each other until they assume the open position defined by stops 17, 17 arranged on the track 10 at the opposite ends thereof for engagement with the respective trolleys. With such movement of the trolleys 12, 12 toward the open position, the now rotating side brushes 23, 23 are carried sidewise away from each other while keeping contacting engagement with the front side of the vehicle V to clean it effectively. When the trolleys 12, 12 reach their outermost position engaging with the respective stops 17, the control elements 19 are actuated to energize drive motors 2 and 46 for further cleaning operation described below.

Figure 4B:
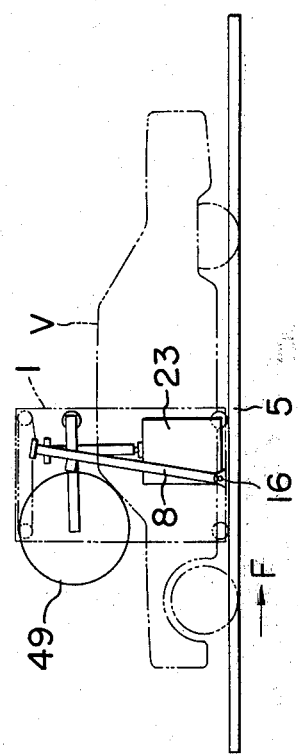

Energization of drive motor 2 causes the travelling frame 1 again to start travelling in the direction indicated by the arrow F in FIGS. 4a and 4b while with energization of drive motor 46 the chain belts 41, 41' are driven through the speed reduction unit 45 to run around the respective sprocket wheels 42, 43 and 42', 43' so as to cause the portal swingable frame 8 to swing slowly forward or rightward, as viewed in FIG. 4b, about the aligned axes of pivotal connections 16, carrying the side brushes 23 and top brush 49 forwardly against the vehicle V. Subsequently, when the portal swingable frame 8 comes in engagement with stop 9' (FIG. 2), the adjacent control element 58' is actuated and the motor 46 is de-energized to stop. Simultaneously with this, the clutches between the respective drive motors 24 and trolley wheels 13 are released to allow the trolleys 12, 12 to run down the inclined sections of the track 10 under gravity toward the closed position and in this manner the side brushes 23, 23 are urged inwardly against the respective sides of the vehicle V to clean the vehicle sides in an effective manner as the travelling frame 1 proceeds. During the time in which the side brushes 23, 23 are cleaning the front and side surfaces of the vehicle, as described above, the top brush 49 rotating under the drive of motor 50 is placed under its own weight in contact with the top surfaces of the vehicle for cleaning operation thereon. In this manner, the whole side and top surfaces of the vehicle are cleaned progressively as the travelling frame 1 proceeds by side and top brushes 23 and 49 positioned as shown in FIG. 4b.

Toward the end of such cleaning operation, as soon as the side brushes 23, 23 are separated from the vehicle sides, the trolleys 12, 12, carrying respective side brushes 23, 23, are allowed to run down the inclined half sections of the track 10 in the closing direction to engage with the respective stops 18, 18 while at the same time closing the control elements 20, 20 to de-energize the drive motors 15 and 24. In the meantime, the control element 55 arranged on the bottom of the travelling frame 1 is brought into engagement with the dog 57 arranged on the guide rail 5 and is thus actuated to de-energize the drive motor 2, causing the travelling frame 1 to stop to complete its forward stroke of travel, as shown in FIG. 4c.

Subsequently, when another operating switch, also not shown and provided for returning movement of the travelling frame 1, is closed, the drive motor 52 is energized to turn the horizontal support shaft 47 thereby to swing up the top brush 49 until the brush supporting arm bracket 48 comes into engagement with the stop 53. The side brushes 23, 23 are again driven to rotate and the travelling frame 1 is started to travel backward, as indicated by the arrow B in FIG. 4c, with the top brush 49 held swung up, as shown by the solid line in the figure, whereby the side brushes 23, 23 are urged against the rear side of the vehicle and then against the lateral sides thereof substantially in the same manner as described hereinbefore with reference to FIG. 4a to clean the rear and side surfaces of the vehicle once again. Also, during the backward travelling movement, the portal swingable frame 8 is held swung forward or leftward, as viewed in FIG. 4d, in engagement with the stop 9 to ensure efficient cleaning operation of the side brushes 23, 23 on the vehicle sides.

When the travelling frame 1 is returned to its initial, leftmost position shown in FIG. 4a, the control element 55 is actuated by the dog 56, arranged on the guide rail 5, to cause the travelling frame 1 to stop to complete the entire cycle of vehicle cleaning operation.

To summarize, the vehicle cleaning apparatus of the present invention includes top and side brushes carried by a portally shaped swingable frame 8, which is pivoted at the bottom to the travelling frame 1 of the apparatus and swingable in either direction of travel of the travelling frame so that the top and side brushes can proceed ahead of the travelling frame 1 during its travel in either direction. This means that the distance over which the travelling frame 1 is required to travel for cleaning operation and hence the length of guide rails on which the frame is mounted can be reduced as much as the top and side brushes 23, 23 are movable relative to the travelling frame. It will be appreciated, therefore, that the apparatus of the invention can advantageously be installed in a restricted area much narrower than usually required for installation of conventional vehicle cleaning apparatus of the type described.

What is claimed is:

1. A vehicle cleaning apparatus, comprising a portally shaped travelling frame structure adapted to travel over a vehicle to be cleaned in straddling relation thereto and including first drive means for moving said travelling frame structure longitudinally back and forth, a portally shaped swingable frame pivotally connected at the lower portion thereof to said travelling frame structure for forward and backward swinging movement relative thereto, second drive means for pivoting said swingable frame about its pivotal connection, means for defining the limits of the angular pivotal range of said swingable frame relative to said travelling frame structure, a pair of rotatable side cleaning brushes suspended from the top portion of said swingable frame and movable in a direction transverse to the pivotal movement of said swingable frame, first control elements operable to energize said first and second drive means to move said travelling frame structure and at the same time to pivot said swingable frame in the direction in which said travelling frame structure is moving when said side brushes are moved outwardly away from each other to assume their open position, and second control elements operable to stop the operation of said second drive means when said swingable frame is pivoted into engagement with said angular range defining means.

2. A vehicle cleaning apparatus according to claim 1, wherein said first drive means comprises a pair of drive motors mounted on the lower portion of said travelling frame structure on the opposite sides thereof, and at least two pairs of driven and free wheels are mounted on the bottom of said travelling frame structure each pair being arranged on the opposite sides thereof, each of said driven wheels being drivably connected with said respective drive motors through respective transmission mechanisms.

3. A vehicle cleaning apparatus according to claim 1, wherein said second drive means comprises a drive motor mounted on said travelling frame structure and is operably connected to said swingable frame by means of a transmission mechanism having a speed reduction unit interposed therebetween.

4. A vehicle cleaning apparatus according to claim 3, wherein said transmission mechanism includes at least one pair of sprocket wheels secured to said travelling frame structure on the opposite sides of said swingable frame and at least one chain belt having its ends fixed to the top portion of said swingable frame on the opposite sides thereof and entrained around said pair of sprocket wheels.

5. A vehicle cleaning apparatus according to claim 1, including a trolley track transversely journaled on the top portion of said swingable frame by means of a pair of bearings for free rotation about an aligned axis of said bearings, and a pair of trolleys mounted on said trolley track for movement therealong and respectively carrying said side brushes.

6. A vehicle cleaning apparatus according to claim 5, wherein said trolley track is resiliently supported by means of an appropriate support assembly in a substantially horizontal position at all times at all angular positions of said swingable frame inclined within a definite range of inclination.

7. A vehicle cleaning apparatus according to claim 6, wherein said first control elements are mounted on said trolley track near the opposite ends thereof so as to be actuated by engagement with said trolleys when they are moved outwardly away from each other to assume their open or outermost position.

8. A vehicle cleaning apparatus according to claim 5, wherein said support assembly for said trolley track comprises a lateral arm formed on one side of said track and extending substantially in a horizontal direction, a vertical rod pivotally connected to the extremity of said arm and extending through a tubular spring case, said vertical rod having a pair of upper and lower spring seats fixed thereto and slidably accommodated in said spring case, said spring case having an intermediate spring seat secured thereto between said upper and lower spring seats and accomodating a pair of upper and lower coiled neutralizing springs on the opposite sides of said intermediate spring seat, and a support rod carrying at its upper portion said spring case and pivoted at its lower portion to the lower portion of said travelling frame structure.

9. A vehicle cleaning apparatus according to claim 1, wherein said angular range defining means for said swingable frame comprises a pair of stop means arranged on at least one side portion of said travelling frame structure in spaced-apart relation to each other on the opposite sides of said swingable frame for engagement therewith.

10. A vehicle cleaning apparatus according to claim 1, comprising at least one rotatable top cleaning brush for cleaning the top surfaces of a vehicle, a pair of arm brackets supporting said top brush between them and swingably connected to said swingable frame by means of a pair of support shafts, and a drive motor mounted on one of said arm brackets for driving said top brush to rotate.

11. A vehicle cleaning apparatus according to claim 1, wherein a pair of guide rails are provided adapted to act cooperably with means carried by said travelling frame structure for guiding the travel of said travelling frame structure therealong.

* * * * *